United States Patent
Golovkina et al.

(10) Patent No.: US 7,722,824 B2
(45) Date of Patent: May 25, 2010

(54) SYNTHESIS OF ARRAYS OF OLIGONUCLEOTIDES AND OTHER CHAIN MOLECULES

(75) Inventors: Viktoriya N. Golovkina, Madison, WI (US); Franco Cerrina, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 967 days.

(21) Appl. No.: 11/497,544

(22) Filed: Aug. 1, 2006

(65) Prior Publication Data
US 2007/0183943 A1    Aug. 9, 2007

Related U.S. Application Data

(60) Provisional application No. 60/704,826, filed on Aug. 2, 2005.

(51) Int. Cl.
*B01J 19/00* (2006.01)
(52) U.S. Cl. ............................ 422/130
(58) Field of Classification Search ............ 422/130
See application file for complete search history.

(56) References Cited

U.S. PATENT DOCUMENTS

| | | | |
|---|---|---|---|
| 3,748,015 A | 7/1973 | Offner | |
| 4,571,603 A | 2/1986 | Hornbeck et al. | |
| 4,596,992 A | 6/1986 | Hornbeck | |
| 4,615,595 A | 10/1986 | Hornbeck | |
| 4,947,413 A | 8/1990 | Jewell et al. | |
| 5,028,939 A | 7/1991 | Hornbeck et al. | |
| 5,096,279 A | 3/1992 | Hornbeck et al. | |
| 5,143,854 A | 9/1992 | Pirrung et al. | |
| 5,318,679 A | 6/1994 | Nishioka | |
| 5,405,783 A | 4/1995 | Pirrung et al. | |
| 5,424,186 A | 6/1995 | Fodor et al. | |
| 5,445,934 A | 8/1995 | Fodor et al. | |

(Continued)

FOREIGN PATENT DOCUMENTS

EP    0 961 174 A2    12/1999

(Continued)

OTHER PUBLICATIONS

U.S. Appl. No. 60/074,368, filed Feb. 11, 1998, Gao et al.

(Continued)

*Primary Examiner*—Walter D Griffin
*Assistant Examiner*—Bobby Ramdhanie
(74) *Attorney, Agent, or Firm*—Whyte Hirschboeck Dudek S.C.

(57) ABSTRACT

Synthesis of arrays of chain molecules, such as oligonucleotides, in large quantities can be carried out utilizing projection onto an active substrate of a magnified image of a light emitting object array having selectable regions of light and dark areas forming a pattern. Projection optics formed entirely of mirrors are used to receive the light emitted from the object array and image the pattern of the array onto the active surface of the substrate. The mirrors in the projection optics include a first, concave mirror, a second, convex mirror, a third, concave mirror, and a fourth, convex mirror, each receiving the beam of light in turn, with the light reflected from the fourth mirror being imaged onto the active surface of the substrate with an image area greater than that of the original light emitting array.

22 Claims, 5 Drawing Sheets

U.S. PATENT DOCUMENTS

| | | | |
|---|---|---|---|
| 5,489,678 | A | 2/1996 | Fodor et al. |
| 5,510,270 | A | 4/1996 | Fodor et al. |
| 5,578,832 | A | 11/1996 | Trulson et al. |
| 5,583,688 | A | 12/1996 | Hornbeck |
| 5,593,839 | A | 1/1997 | Hubbell et al. |
| 5,604,624 | A | 2/1997 | Magarill |
| 5,631,734 | A | 5/1997 | Stern et al. |
| 5,691,541 | A | 11/1997 | Ceglio et al. |
| 5,744,101 | A | 4/1998 | Fodor et al. |
| 5,744,305 | A | 4/1998 | Fodor et al. |
| 5,753,788 | A | 5/1998 | Fodor et al. |
| 5,815,310 | A | 9/1998 | Williamson |
| 5,870,176 | A | 2/1999 | Sweatt et al. |
| 5,959,098 | A | 9/1999 | Goldberg et al. |
| 6,060,224 | A | 5/2000 | Sweatt et al. |
| 6,225,625 | B1 | 5/2001 | Pirrung et al. |
| 6,271,957 | B1 | 8/2001 | Quate et al. |
| 6,295,153 | B1 | 9/2001 | Garner |
| 6,375,903 | B1 * | 4/2002 | Cerrina et al. .............. 422/131 |
| 6,386,715 | B2 | 5/2002 | Braat |
| 6,426,184 | B1 | 7/2002 | Gao et al. |
| 7,037,659 | B2 | 5/2006 | Cerrina et al. |
| 7,083,975 | B2 | 8/2006 | Green et al. |
| 7,157,229 | B2 | 1/2007 | Cerrina et al. |
| 7,183,406 | B2 | 2/2007 | Belshaw et al. |
| 2002/0018309 | A1 * | 2/2002 | Braat .......................... 359/856 |
| 2003/0143550 | A1 | 7/2003 | Green et al. |
| 2004/0126757 | A1 | 7/2004 | Cerrina |
| 2004/0132029 | A1 | 7/2004 | Sussman et al. |

FOREIGN PATENT DOCUMENTS

| | | |
|---|---|---|
| WO | WO 93/22678 | 11/1993 |
| WO | WO 99/41007 | 8/1999 |
| WO | WO 99/63385 | 12/1999 |
| WO | WO 0244786 A2 * | 6/2002 |

OTHER PUBLICATIONS

U.S. Appl. No. 09/639,602, filed Aug. 15, 2000, Cerrina et al.
U.S. Appl. No. 11/524,082, filed Sep. 20, 2006, Cerrina et al.
Offner, A., "New Concepts in Projection Mask Aligners," *Optical Engineering*, vol. 14(2), pp. 130-132 (Mar.-Apr. 1975), pp. 147-149, published by SPIE.
Kerth, R.T., et al., "Excimer Laser Projection Lithography on a Full-Field Scanning Projection System," *IEEE Electron Device Letters*, vol. EDL-7, No. 5, May 1986, pp. 299-301.
Goodall, F.N., et al., "Excimer Laser Photolithography with 1:1 Wynne-Dyson Optics," *Optical Laser/Microlithography*, vol. 922, 1988, pp. 410-416, published by SPIE.
Ruff, B., et al., "Broadband Deep-UV High NA Photolithography System," *Optical/Laser Microlithography II*, vol. 1088, 1989, pp. 441-446, published by SPIE.
Sommargren, G., "Performance of a Two Mirror, Four Reflection, Ring Field Imaging System," *OSA Proceedings on Extreme Ultraviolet Lithography*, vol. 23, 1994, pp. 103-108, published by Optical Society of America.
Richmond, K., et al., "Amplification and Assembly of Chip-Eluted DNA (AACED): a Method for High-Throughput Gene Synthesis," *Nucleic Acids Research*, vol. 32, No. 17, 2004, pp. 5011-5018, published by Oxford University Press.
Melles Griot online glossary and product catalog, http://www.mellesgriot.com/glossary/wordlist/glossarydetails.asp?wID=105, printed Mar. 25, 2005.
Linos Worldwide Laser Beam Expander Systems product catalog, www.linos-catalog.com, printed from the World Wide Web prior to Aug. 1, 2006.
Laser Beam Products, from Laser Components, Inc., product catalog, www.lasercomponentsusa.com, printed from the World Wide Web prior to Aug. 1, 2006.
Laser Beam Expanders from Lambda/Ten Optics, http://www.mcphersoninc.com/lambdaten/laserbeamexpanders.htm, printed Mar. 25, 2005.
Beam Expander KST, from Kugler of America LP product catalog, www.kuglerofamerica.com, issue Sep. 1998, printed from the World Wide Web prior to Aug. 1, 2006.
Laser Beam Expander, http://www.optisurf.com/product4.htm, printed Mar. 25, 2005.
International Search Report for PCT/US2006/029755 dated Jun. 19, 2008.
Final Office Action, U.S. Appl. No. 09/639,602 filed Aug. 15, 2000, mailed on Sep. 17, 2009.

* cited by examiner

SYNTHESIS OF ARRAYS OF OLIGONUCLEOTIDES AND OTHER CHAIN MOLECULES

STATEMENT OF GOVERNMENT RIGHTS

This invention was made with United States government support awarded by the following agency: NSF 0319902. The United States government has certain rights in this invention.

FIELD OF THE INVENTION

This invention relates generally to the field of molecular biology and particularly to the artificial synthesis of oligonucleotides and other chain molecules.

BACKGROUND OF THE INVENTION

Various alternatives to conventional DNA (deoxyribonucleic acid) sequencing have been proposed. One such alternative approach, utilizing an array of oligonucleotide probes synthesized by photolithographic techniques, is described in Pease, et al., "Light-Generated Oligonucleotide Arrays for Rapid DNA Sequence Analysis," Proc. Natl. Acad. Sci. USA, Vol. 91, pp. 5022-5026, May 1994. In this approach, the surface of a solid support modified with photolabile protecting groups is illuminated through a photolithographic mask, yielding reactive hydroxyl groups in the illuminated regions. A 3' activated deoxynucleoside, protected at the 5' hydroxyl with a photolabile group, is then provided to the surface such that coupling occurs at sites that had been exposed to light. Following coupling and oxidation, the substrate is rinsed and the surface is illuminated through a second mask to expose additional hydroxyl groups for additional coupling. A second 5' protected activated deoxynucleoside base is presented to the surface. The selective photodeprotection and coupling cycles are repeated to build up levels of bases until the desired set of probes is obtained. It may be possible to generate high density miniaturized arrays of oligonucleotide probes using such photolithographic techniques wherein the sequence of the oligonucleotide probe at each site in the array is known. These probes can then be used to search for complementary sequences on a target strand of DNA, with detection of the target that has hybridized to particular probes accomplished by the use of fluorescent markers coupled to the targets and inspection by an appropriate fluorescence scanning microscope. A variation of this process using polymeric semiconductor photoresists, which are selectively patterned by photolithographic techniques, rather than using photolabile 5' protecting groups, is described in McGall, et al., "Light-Directed Synthesis of High-Density Oligonucleotide Arrays Using Semiconductor Photoresists," Proc. Natl. Acad. Sci. USA, Vol. 93, pp. 13555-13560, November 1996, and G. H. McGall, et al., "The Efficiency of Light-Directed Synthesis of DNA Arrays on Glass Substrates," Journal of the American Chemical Society 119, No. 22, 1997, pp. 5081-5090.

A disadvantage of both of these approaches is that four different lithographic masks are needed for each monomeric base, and the total number of different masks required is thus up to four times the length of the DNA probe sequences to be synthesized. The high cost of producing the many precision photolithographic masks that are required, and the multiple processing steps required for repositioning of the masks for every exposure, contribute to relatively high costs and lengthy processing times. Techniques have been developed for the creation of arrays of probe sequences, polypeptides, and other large chain molecules using patterning processes that do not require multiple masks. See U.S. Pat. No. 6,375,903, and published United States patent application publication Nos. 2003/0068633, 2003/0143132, 2003/0143550, 2003/0143724, 2003/0148502, 2004/0126757, and 2004/0132029, which are incorporated herein by reference. The synthesis of oligomers in the production of high density microarrays is typically carried out on flat glass substrates. The amount of a particular oligomer synthesized in this manner is in the range of femtomoles. For example, for a typical oligomer density of about 20 picomoles/cm$^2$, a DNA microarray 1.5 cm×1.7 cm in size will yield approximately 50 picomoles total. If the microarray chip contains 250 different oligomer sequences, the amount of each particular oligomer will be about 200 femtomoles, and likely even less taking into account the chip areas lost to controls, etc. It would be highly desirable to increase the amount of each oligomer to the 1-100 picomoles range. However, increasing the active area of the flat microarray substrate surface to increase the amount of oligomers produced has generally not been practical.

SUMMARY OF THE INVENTION

In accordance with the present invention, synthesis of arrays of oligonucleotides and other chain molecules in relatively large quantities that may be utilized for such purposes as gene synthesis, is carried out in an automated manner under computer control. The areas of each element of the array in which a different oligonucleotide is synthesized can be increased significantly to produce quantities of oligomers greater than can typically be produced utilizing microarray chips.

Apparatus for synthesis of arrays of chain molecules in accordance with the invention includes a substrate with an active surface on which the arrays may be formed. A light emitting object array having selectable light and dark areas in the array is used to define the image that will be projected on to the active surface. The object array may, for example, comprise a light source, providing a light beam, and a micromirror device receiving the light beam which is formed of an array of electronically addressable micromirrors. Each of the micromirrors can be tilted between one of at least two positions, wherein in one of the positions of the micromirror light from the source is deflected away from an optical axis and in the second of the positions light is reflected along the optical axis. Other types of spatial light modulators may be used rather than a micromirror array, and the light emitting array may be self luminous, e.g., an array of LEDs or other light sources. Projection optics receives the light emitted from the light emitting object array and images the pattern of the array onto the active surface of the substrate. Preferred projection optics comprise a first, concave mirror receiving the light from object array and reflecting that light at an angle off the axis of light received from the object array. A second, convex-mirror receives the light reflected from the first mirror and reflects the light off axis from the light received from first mirror. A third, concave mirror receives the light reflected from the second mirror and reflects the light off the axis of the incoming light from the second mirror. A fourth, convex mirror receives the light from the third mirror and reflects the light off the axis of the incoming light from the third mirror and toward the active surface. The first, second, third and fourth mirrors are arranged to form a magnified image of the object array at the active surface, thus substantially increasing the area of each element in the array in which oligomers are formed. For example, the mirrors may be arranged to provide two times magnification of the image of the object array at the active surface, although other magnifications may also be utilized.

By utilizing mirrors rather than refractive elements in the projection optics, aberration and dispersion of light between the illuminated elements of the array can be minimized, increasing the fidelity of the synthesized oligmers. Although not required, the first, second, third and fourth mirrors can each be spherical mirrors for economy of fabrication. Where spherical mirrors are utilized, it is also preferable that the first and second mirrors have the same radius of curvature and that the third and fourth mirrors have the same radius of curvature. A condenser including a light pipe may be included between the light source and the micromirror device to receive the light from the source and provide a collimated beam of light to the micromirror device.

For synthesis of oligonucleotides, a flow cell may be incorporated which encloses the active surface of the substrate and has ports for supplying DNA synthesis reagents into the flow cell that can be flowed over the active surface of the substrate.

Further objects, features and advantages of the invention will be apparent from the following detailed description when taken in conjunction with the accompanying drawings.

DETAILED DESCRIPTION OF THE INVENTION

Figure 1:
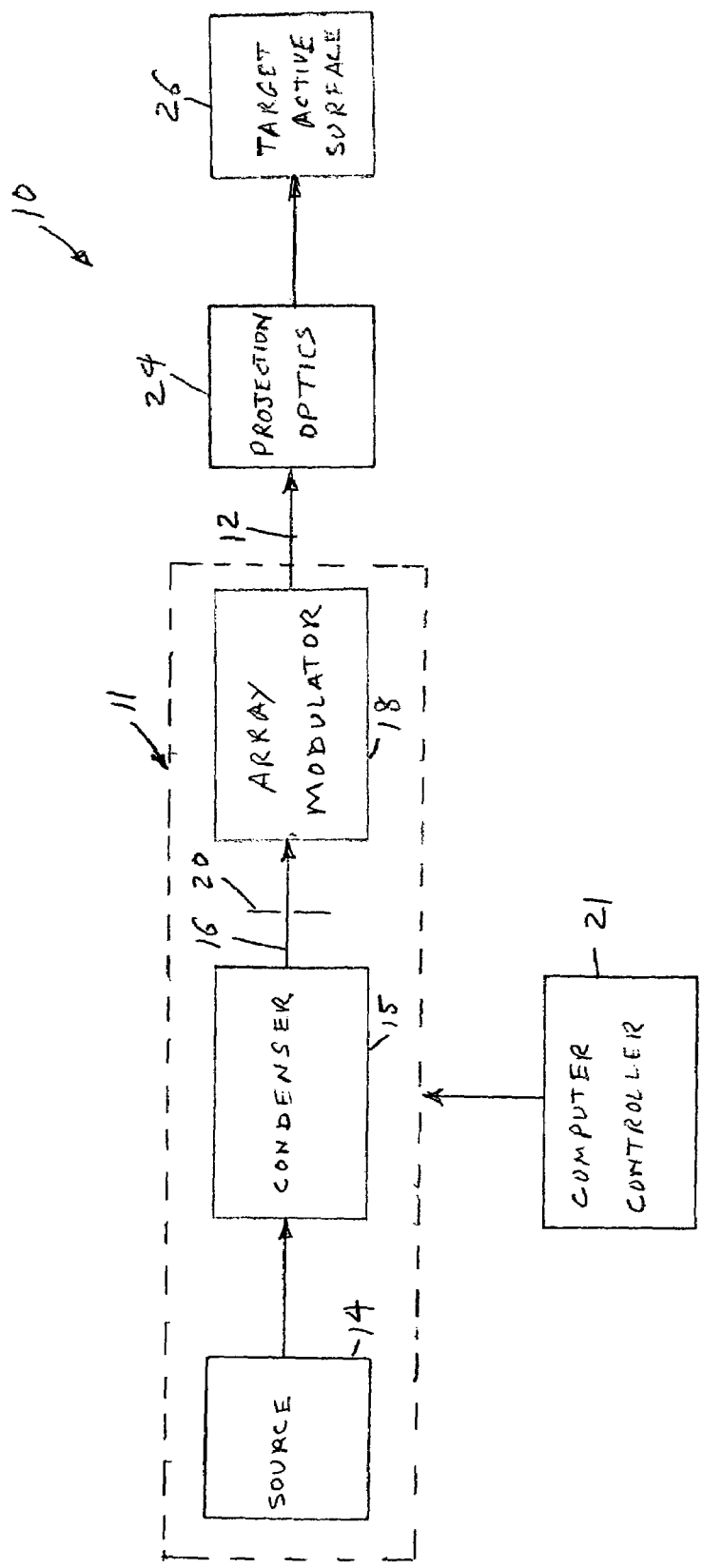
FIG. 1 is a block diagram illustrating the functional components of apparatus for synthesizing arrays of chain molecules in accordance with the invention.

An exemplary apparatus that may be utilized for synthesis of arrays of chain molecules in accordance with the invention is shown generally at 10 in FIG. 1 in block diagram form. The apparatus 10 includes a light emitting object array 11 which provides selectable regions of light and dark areas of emitted light 12. As discussed further below, the object array 11 can include a light source 14, a condenser/collimator 15 which receives the light from the source 14 and provides a collimated output beam 16, and an array modulator 18 which receives the beam of light 16 and modulates it into an array of light and dark areas. An optional aperture 20 may be utilized to limit the beam 16. The object array system 11 operates under the control of a computer controller 21 which provides commands to specify the pattern of light and dark areas in the emitted light 12. The light emitted 12 is received by a projection optics 24 which magnifies the image in the beam 12 and provides a magnified image of the object array onto a target active surface 26. As discussed below, the active surface may comprise a surface of a substrate on which arrays of various oligonucleotides may be formed.

Figure 2:
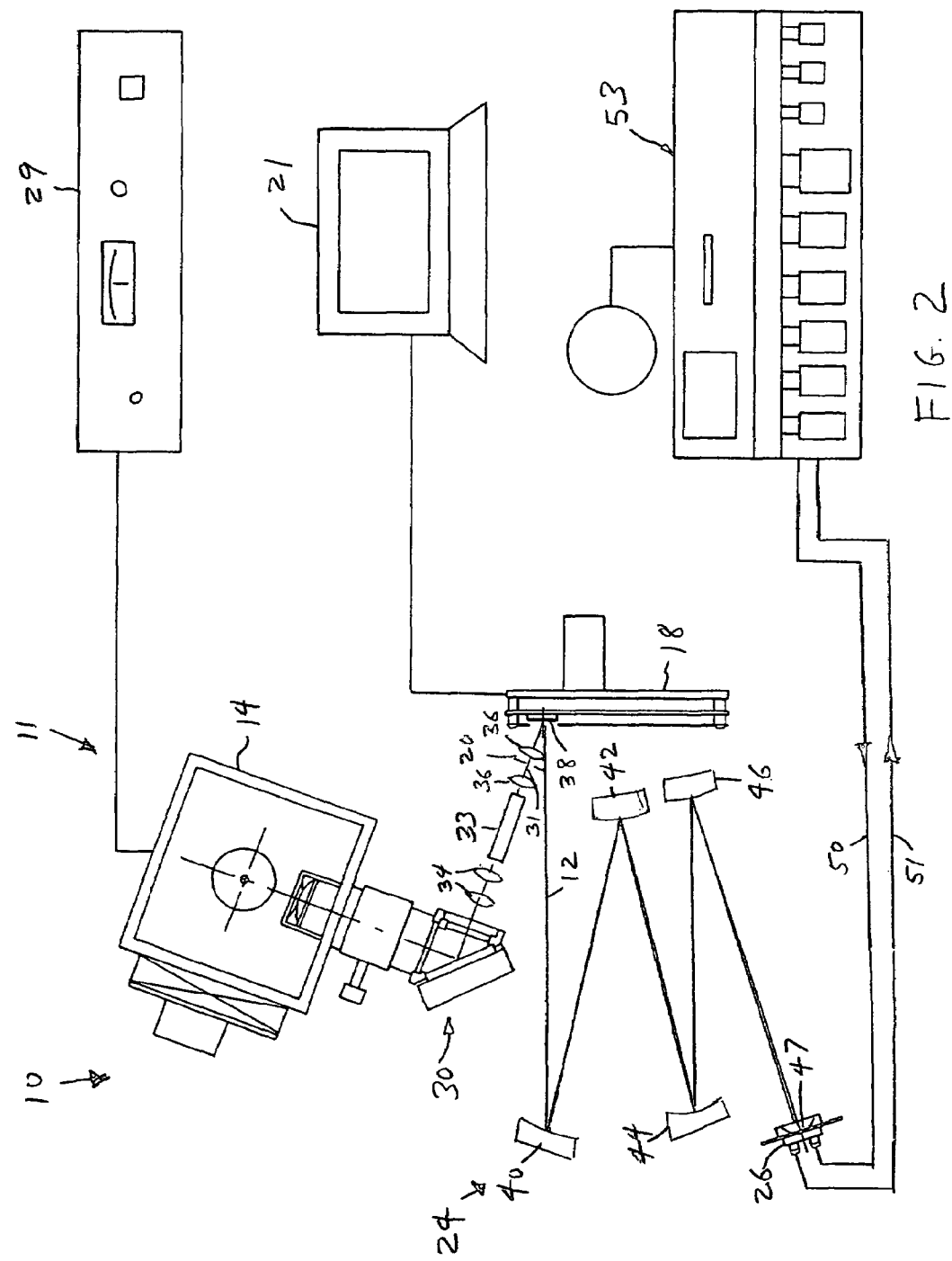
FIG. 2 is a schematic view an array synthesizer apparatus in accordance with the invention.

FIG. 2 illustrates an exemplary embodiment of a synthesis apparatus in accordance with the invention. The object array system includes a light source 14 the spectrum of which is preferably chosen to match the absorption spectrum of the photosensitive compounds with which the apparatus is used. In an exemplary case the source 14 can be an ultraviolet or near ultraviolet source. An example is a mercury arc lamp which is supplied with power from a power supply 29, an optional filter 30 to receive the output from the source and selectively pass only the desired wavelengths (for example, the 365 nm Hg line), and a condenser 15 for forming a collimated beam 31. The condenser 15 may include a light pipe 33, input lenses 34 to focus the light from the source onto the input of the light pipe, and relay lenses 36 to direct the light from the light pipe to a micromirror device array 38 in the modulator 18. Other devices for filtering or monochromating the light source, e.g., diffraction gratings, dichroic mirrors, and prisms, may also be used and are referred to herein as "filters".

A preferred micromirror array 38 is the digital micromirror device (DMD—also referred to as a Digital Light Processor) available commercially from Texas Instruments, Inc. These devices and the utilization of such devices in forming arrays for synthesis of DNA probes are discussed in U.S. Pat. No. 6,375,903, entitled Method and Apparatus for Synthesis of Arrays of DNA Probes, the disclosure of which is incorporated herein by reference. Other spatial modulators, including liquid crystal displays (LCD), micro-shutters, arrays of light emitting diodes or of laser diodes, etc., may also be utilized to form the pattern of light and dark elements of the object array in accordance with the invention.

The light emitted from the array 38 in a beam 12 is received by the projection optics 24, which includes a first, concave mirror 40 that receives the light from the object array and reflects that light at an angle off the axis of light received from the object array. A second, convex mirror 42 receives the light reflected from the first mirror 40 and reflects that light off the axis of the light received from the first mirror. A third, concave mirror 44 receives the light reflected from the second mirror and reflects the light off the axis of the incoming light from the second mirror. A fourth, convex mirror 46 receives the light reflected from the third mirror and reflects the light off the axis of the incoming light from the third mirror and toward the active surface 47 of the target 26. The first, second, third and fourth mirrors are arranged to form a magnified image of the object array 38 at the active surface 47. The target 26 may comprise a flow cell into which DNA synthesis reagents flow in and out on lines 50 and 51 from a standard DNA synthesizer 53 which is supplied with the requisite DNA synthesis chemicals. Selective patterning of an active surface of a substrate to form oligonucleotides and other chain molecules is further described in the aforesaid U.S. Pat. No. 6,375,903. If desired, image locking to counter image drift may be incorporated, as described in U.S. Patent Application Publication No. 2005/0249396.

Figure 3:
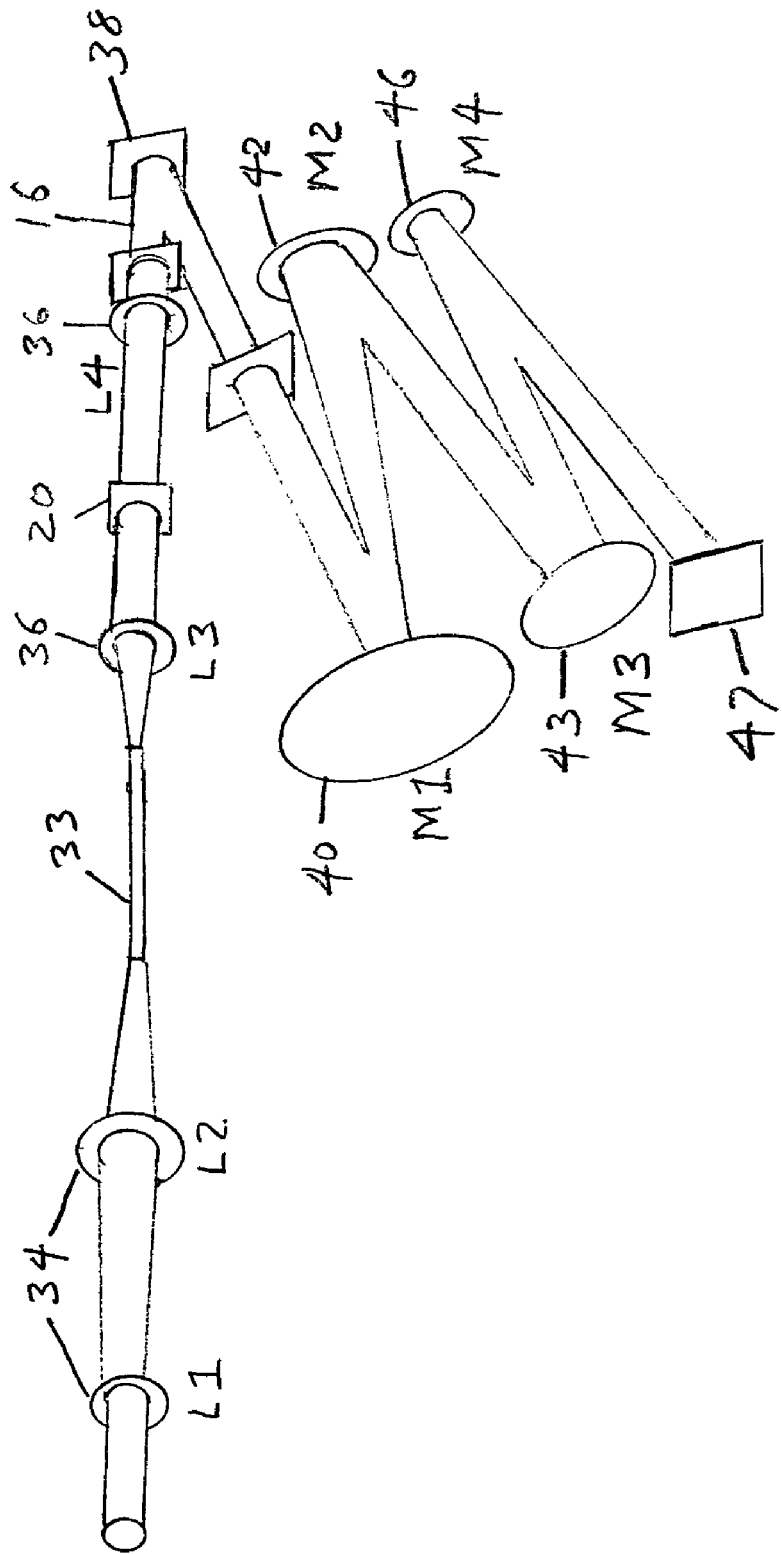
FIG. 3 is a simplified illustrative view of the optical components and their relative position in space in the apparatus of FIG. 2.
Figure 4:
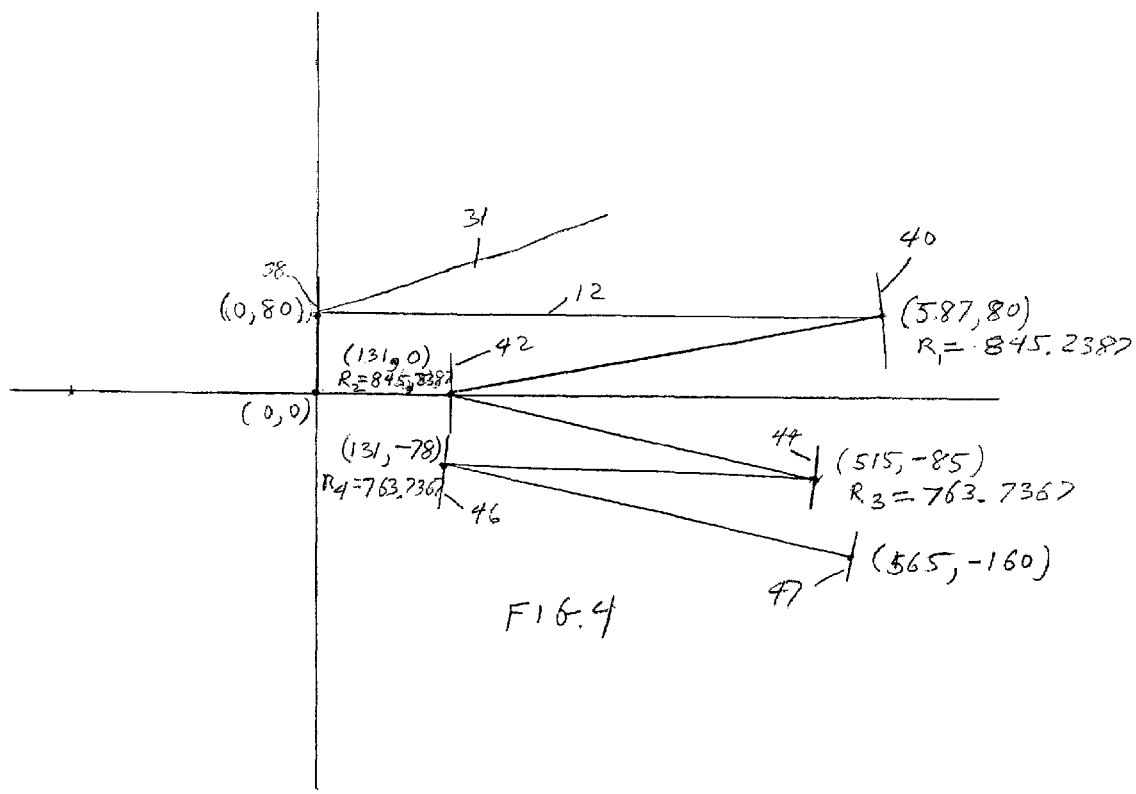
FIG. 4 is a diagram illustrating exemplary positions and reflective surface radii for the mirrors in the projection optics of the apparatus of FIG. 2.
Figure 5:
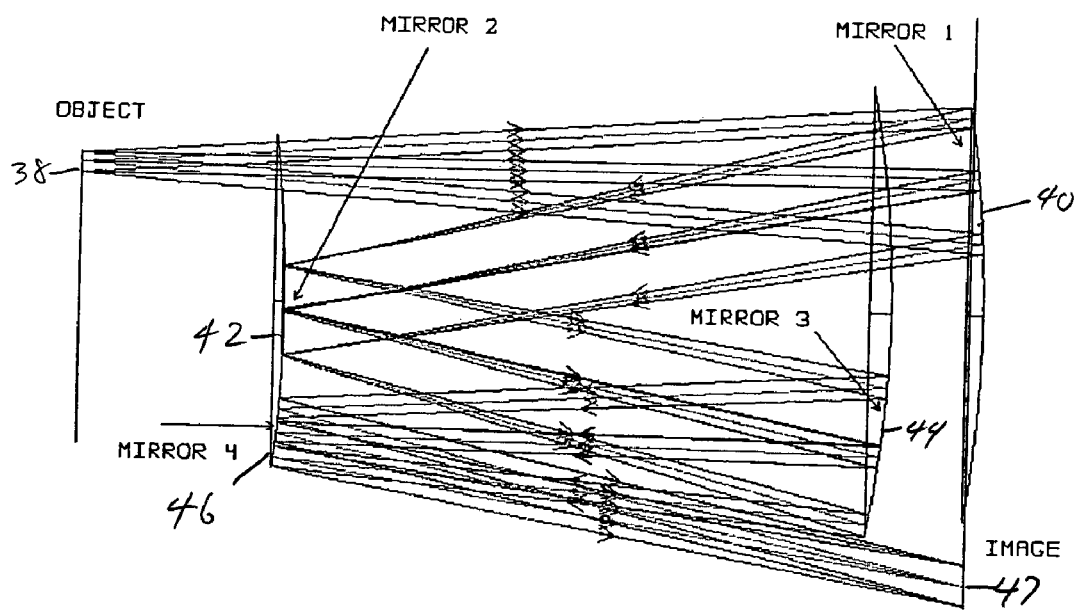
FIG. 5 is a ray diagram illustrating the optical paths of rays from the object array to the image of the array at the active surface for the exemplary arrangement of mirrors shown in FIG. 4.

An illustrative view showing the optical components of the object array and the preferred projection optics is shown in FIG. 3. A diagram showing the relative positions and radii of spherical mirrors used for the mirrors 40, 42, 44 and 46 is shown in FIG. 4, and a ray diagram for these mirrors is shown in FIG. 5.

Typical sources 14 used for generating UV radiation at 365 nm are Hg and Hg—Xe arc lamps, light emitting diodes, or gas lasers (argon), and solid state lasers. Each of these sources has advantages and disadvantages. An illumination system based on the use of a light pipe and a simple optical relay system is preferred so as to match the etendues. The light pipe 33 is simple and effective, and it can be used with both arc lamps and lasers. In illumination systems, there are several goals to be fulfilled simultaneously, including matching the source and imaging system, delivering the required uniformity, and delivering the required degree of spatial coherence.

Lasers are ideal sources because their etendue is extremely small (diffraction limited), and thus can match the optics' etendue without loss. Very briefly, the concept of "etendue" arises from the Lagrange-Smith optical invariant:

$$E = \Delta \times (a) = \Delta \times NA^2(m^2 rad^2) = \text{Area} \times \text{Solid Angle}$$

$$\text{Power Accepted} = \text{Source Power} \times \frac{E_{optics}}{E_{Source}} \leq \text{Source Power}$$

Thus, a source with small etendue is highly desirable. The acceptance of the preferred optics is relatively small because of the NA of 0.07, thus making it difficult to efficiently match the arc lamp. Thus, a careful design of the system is necessary. The optical system illustrated in FIG. 3 is selected to match the optics with the source.

The first lens, L1 of the input lenses 34 shown in FIG. 3, may be a stock compound lens (Oriel Co.) designed to match the lamp source, and preferably has a high acceptance of NA=0.7. The light pipe 33 achieves uniformity of illumination because of the large number of reflections (as in a kaleidoscope), so that the output image is formed by the superposition of many virtual sources, each contributing a different part of the angle. Thus, the light pipe efficiently averages the angular distribution of the input. The number of reflections is given by $N_{refl}=L_{pipe}/NA_{input}$. In order to have a good averaging, $N_{refl} \geq 5$; if the convergence angle is small, then one ends up with a very long light pipe. Hence, a two-stage condenser is preferred, where the light from the lamp is first focused down to the entrance of the light pipe by the lens 34 couple L1 and L2; then, a relay system, formed of the L3 and L4 lenses 36, adjusts the angles (i.e., magnification) to match the light pipe and the array modulator 38. Thus, the light pipe is ½ scale of the array 38, i.e., with an entrance NA=0.14, allowing use of ½ the length of a design based on a 0.07 aperture. The degree of spatial coherence is determined by the filling of the pupil of the imaging system. In lithography and microscopy, the best illumination is obtained in Kohler illumination where the source is imaged on the pupil, (the second mirror 42, in this case). An iris 20 can be inserted between the relay lenses L3 and L4 to further control the angular aperture of the beam; the intermediate focus is the image of the source far-field, i.e., of its angular distribution (after the light pipe).

Catoptrics (mirror only) optical systems are preferably used in forming arrays of oligonucleotides and similar chain molecules because mirror surfaces contribute less scatter than lenses and are achromatic. Many extreme ultraviolet (EUV) optical designs uses aspherical optics in order to achieve a large field of view with very small aberrations; these optics are, however, extremely expensive and may be difficult to obtain. Optical systems utilizing two spherical mirrors have been utilized for EUV lithography. See, G. A. Sommargren, OSA Proc. on EUV Lithography, 23, 1994, pp 103, et seq. Such a design utilizes only spherical surfaces, and is of simple implementation. Only two mirrors are used, but four reflections take place. The two mirrors have the same radius R, and are displaced by a prescribed amount ($\Delta$). A design based on two sets of mirrors of different radius is preferred in the present invention as it yields better imaging for a full-field system (as compared to a scanning system). In a preferred arrangement, the first and second mirrors 40 and 42 have the same radius of curvature, and the third and fourth mirrors 44 and 46 have the same radius of curvature. The design avoids obstructions (a common pitfall in catoptrics systems design) while maintaining good imaging. The optics are axially symmetric, with an off-axis object. Because spherical mirrors are used, a "section" of the large mirrors of FIG. 5 is simply a smaller size mirror displaced and tilted with its normal facing the center of curvature. The dimensions (in mm) and summary prescription data of the optics are listed in Table 1 below. The size of the mirrors is relatively small, and the whole optical system fits comfortably in a 700 by 300 mm footprint.

TABLE 1

| Element | Location (y, x) | | Separation | Radius | Diameter | Note |
|---|---|---|---|---|---|---|
| DLP | 0 | 80 | 0.00 | — | 17 × 13 | |
| Mirror 1 | 587 | 80 | 587.4937 | −845.2387 | 80 | Concave |
| Mirror 2 | 131 | 0 | −455.9544 | −845.2387 | 75 | Convex |
| Mirror 3 | 515 | −85 | 384.0833 | −763.7367 | 80 | Concave |
| Mirror 4 | 131 | −78 | −384.0833 | −763.7367 | 60 | Convex |
| Reaction Cell | 565 | −160 | 434.0833 | — | 34 × 26 | |

An optimal partitioning of the 1024×768 pixels of a conventional Digital Light Processor chip for 10,000 different sequences yields a 10×8 rectangle. A tile of 10×8 mirrors may be used with 1 mirror "off" as an isolation to have finally a synthesis area 9×7. Assuming a yield of 20 pMol/cm$^2$ (which is fairly standard with flat glass surfaces), 14 fM of oligomer can be synthesized for each of 10,000 possible sequences. Similarly, a run of 1,000 sequences will yield 165 fM of oligomers for each individual sequence, as shown in Table 2 below.

TABLE 2

| Micromirrors (Active) | 21 | 34 |
|---|---|---|
| Image Size (micron) | 714 | 1156 |
| Area (micron$^2$) | | 0.83 10$^6$ |
| Synthesis (20 pMol/cm$^2$) | | 165 fM |

The amount of oligomer thus created on the chip is sufficient for massive libraries of oligomers.

For the purposes of this disclosure and unless otherwise specified, "a" or "an" means "one or more". All patents, applications, references and publications cited herein are incorporated by reference in their entirety to the same extent as if they were individually incorporated by reference.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

It is understood that the invention is not confined to the particular embodiments set forth herein as illustrative, but embraces all such forms thereof as come within the scope of the following claims.

What is claimed is:

1. Apparatus for synthesis of arrays of chain molecules comprising:
   (a) a substrate with an active surface on which the arrays may be formed;
   (b) a light emitting object array configured to emit a pattern of light and dark areas; and
   (c) projection optics configured to receive the light emitted from the light emitting object array and to image the pattern of light and dark areas onto the active surface of the substrate, the projection optics comprising a first, concave mirror configured to receive the light from the object array and to reflect that light at an angle off the axis of the light received from the object array, a second, convex mirror configured to receive the light reflected from the first mirror and to reflect the light off the axis of the light received from the first mirror, a third, concave mirror configured to receive the light reflected from the second mirror and to reflect the light off the axis of the light received from the second mirror, and a fourth, convex mirror configured to receive the light from the third mirror and to reflect the light off the axis of the light received from the third mirror and to image the light onto the active surface, the first, second, third and fourth mirrors arranged to form a magnified image of the pattern of light and dark areas at the active surface.

2. The apparatus of claim 1 further including a flow cell enclosing the active surface of the substrate and having ports for applying DNA synthesis reagents into the flow cell which can be flowed over the active surface of the substrate.

3. The apparatus of claim 1 wherein the first, second, third, and fourth mirrors are arranged to provide two times magnification of the image of the pattern of light and dark areas at the active surface.

4. The apparatus of claim 1 wherein the first, second, third, and fourth mirrors are each spherical mirrors.

5. The apparatus of claim 4 wherein the first and second mirrors have the same radius of curvature and the third and fourth mirrors have the same radius of curvature.

6. The apparatus of claim 1 wherein the object array comprises a light source and a micromirror device configured to receive a light beam from the light source and formed of an array of electronically addressable micromirrors, each of which can be selectively tilted between one of at least two separate positions, wherein in one of the positions of each micromirror the light from the source incident upon the micromirror is deflected away from an optical axis and in a second of the at least two positions of the micromirror the light is reflected along the optical axis.

7. The apparatus of claim 6 further including a condenser between the light source and the micromirror device, the condenser configured to receive the light from the source and to provide a collimated beam of light to the micromirror device.

8. The apparatus of claim 7 wherein the condenser includes a light pipe.

9. The apparatus of claim 6 wherein the micromirror device is formed of a two dimensional array of micromirrors.

10. The apparatus of claim 1 wherein the first mirror is configured to forms an image of the pattern of light and dark areas at the second mirror surface.

11. The apparatus of claim 1 wherein the substrate is transparent and the projection optics are arranged to form the magnified image on the active surface of the substrate which is opposite to the surface which initially receives the light from the projection optics.

12. The apparatus of claim 1 wherein the projection optics are symmetric about an axis of symmetry and the image array is located off the axis of symmetry.

13. Apparatus for synthesis of arrays of chain molecules comprising:
   (a) a substrate with an active surface on which the arrays may be formed;
   (b) a flow cell enclosing the active surface of the substrate and having ports for applying DNA synthesis reagents into the flow cell which can be flowed over the active surface of the substrate;
   (c) a light emitting object array comprising a light source and a micromirror device configured to receive a light beam from the light source and formed of an array of electronically addressable micromirrors, each of which can be selectively tilted between one of at least two separate positions, wherein in one of the positions of each micromirror the light from the source incident upon the micromirror is deflected away from an optical axis and in a second of the at least two positions of the micromirror the light is reflected along the optical axis; and
   (d) projection optics configured to receive the light emitted from the light emitting object array and to image the pattern of light and dark areas onto the active surface of the substrate, the projection optics comprising a first, concave mirror configured to receive the light from the object array and to reflect that light at an angle off the axis of the light received from the object array, a second, convex mirror configured to receive the light reflected from the first mirror and to reflect the light off the axis of the light received from the first mirror, a third, concave mirror configured to receive the light reflected from the second mirror and to reflect the light off the axis of the light received from the second mirror, and a fourth, convex mirror configured to receive the light from the third mirror and to reflect the light off the axis of the light received from the third mirror and to image the light onto the active surface, the first, second, third and fourth mirrors arranged to form a magnified image of the pattern of light and dark areas at the active surface.

14. The apparatus of claim 13 wherein the first, second, third, and fourth mirrors are arranged to provide two times magnification of the image of the pattern of light and dark areas at the active surface.

15. The apparatus of claim 13 wherein the first, second, third, and fourth mirrors are each spherical mirrors.

16. The apparatus of claim 15 wherein the first and second mirrors have the same radius of curvature and the third and fourth mirrors have the same radius of curvature.

17. The apparatus of claim 13 further including a condenser between the light source and the mircromirror device, the condenser configured to receive the light from the source and to provide a collimated beam of light to the micromirror device.

18. The apparatus of claim 17 wherein the condenser includes a light pipe.

19. The apparatus of claim 13 wherein the first mirror is configured to forms an image of the pattern of light and dark areas at the second mirror surface.

20. The apparatus of claim 13 wherein the micromirror device is formed of a two dimensional array of micromirrors.

21. The apparatus of claim 13 wherein the substrate is transparent and the projection optics are arranged to form the magnified image on the active surface of the substrate which is opposite to the surface which initially receives the light from the projection optics.

22. The apparatus of claim 13 wherein the projection optics are symmetric about an axis of symmetry and the image array is located off the axis of symmetry.

* * * * *